United States Patent
Lindall et al.

(10) Patent No.: US 8,455,387 B2
(45) Date of Patent: Jun. 4, 2013

(54) CATALYST AND PROCESS

(75) Inventors: Charles Mark Lindall, Killara (AU); Neville Slack, Cleveland (GB); Martin Graham Partridge, Cleveland (GB)

(73) Assignee: Dorf Ketal Chemicals (India) Pvt. Ltd., Mumbai (IN)

( * ) Notice: Subject to any disclaimer, the term of this patent is extended or adjusted under 35 U.S.C. 154(b) by 0 days.

(21) Appl. No.: 13/544,773

(22) Filed: Jul. 9, 2012

(65) Prior Publication Data

US 2012/0271030 A1    Oct. 25, 2012

Related U.S. Application Data

(62) Division of application No. 10/537,651, filed as application No. PCT/GB03/05180 on Dec. 1, 2003, now Pat. No. 8,232,222.

(30) Foreign Application Priority Data

Dec. 4, 2002 (GB) .................................. 0228267.1

(51) Int. Cl.

| B01J 21/00 | (2006.01) |
|---|---|
| B01J 23/00 | (2006.01) |
| B01J 25/00 | (2006.01) |
| B01J 29/00 | (2006.01) |
| B01J 31/00 | (2006.01) |
| B01J 21/04 | (2006.01) |

(52) U.S. Cl.
USPC ........... 502/150; 502/100; 502/170; 502/171; 502/439

(58) Field of Classification Search
USPC .......................... 502/100, 150, 170, 171, 439
See application file for complete search history.

(56) References Cited

U.S. PATENT DOCUMENTS

| 3,444,139 A | | 5/1969 | Jeurissen et al. | |
|---|---|---|---|---|
| 3,644,291 A | * | 2/1972 | Price et al. | 528/279 |
| 4,452,969 A | | 6/1984 | McCready | |
| 5,527,622 A | | 6/1996 | Kato et al. | |
| 5,561,183 A | | 10/1996 | Kwon et al. | |
| 5,591,800 A | * | 1/1997 | Takekoshi et al. | 524/783 |
| 5,703,139 A | | 12/1997 | Kim et al. | |
| 5,866,710 A | * | 2/1999 | Ridland et al. | 560/98 |
| 5,872,204 A | | 2/1999 | Kuo et al. | |
| 6,075,115 A | | 6/2000 | Putzig et al. | |
| 6,114,458 A | | 9/2000 | Hawker et al. | |
| 6,133,404 A | | 10/2000 | Kang et al. | |
| 6,372,929 B1 | * | 4/2002 | Ridland et al. | 556/24 |
| 6,437,088 B1 | | 8/2002 | Duan | |
| 7,767,612 B2 | * | 8/2010 | Bellamy et al. | 502/103 |
| 8,232,222 B2 | * | 7/2012 | Lindall et al. | 502/100 |
| 2007/0010648 A1 | * | 1/2007 | Partridge et al. | 528/274 |

FOREIGN PATENT DOCUMENTS

| EP | 0812818 A1 | | 12/1997 |
|---|---|---|---|
| EP | 1120392 A1 | | 8/2001 |
| GB | 0 812 818 A1 | * | 12/1997 |
| GB | 2314081 A | | 12/1997 |
| WO | 0071251 A1 | | 11/2000 |
| WO | 0071252 A1 | | 11/2000 |
| WO | 0242537 A2 | | 5/2002 |
| WO | 0242537 A3 | | 5/2002 |
| WO | 2004050239 A2 | | 6/2004 |
| WO | 2004050239 A3 | | 6/2004 |

OTHER PUBLICATIONS

Foreign communication from a related counterpart application—International Preliminary Examination Report, PCT/US01/43256, Mar. 18, 2003, 7 pages.

Foreign communication from a related counterpart application—International Search Report, PCT/US01/43256, Aug. 22, 2002, 4 pages.

Foreign communication from a related counterpart application—International Search Report, PCT/GB03/05180, Jul. 13, 2004, 3 pages.

* cited by examiner

*Primary Examiner* — James McDonough
(74) *Attorney, Agent, or Firm* — Conley Rose, P.C.; Rodney B. Carroll

(57) ABSTRACT

A catalyst composition comprises the reaction product of an alkoxide or condensed alkoxide of a metal M, selected from titanium, zirconium, hafnium, aluminum, or a lanthanide, an alcohol containing at least two hydroxyl groups, a 2-hydroxy carboxylic acid and a base, wherein the molar ratio of base to 2-hydroxy carboxylic acid is in the range 0.01-0.79:1. The composition is useful as a catalyst for esterification reactions, especially for the production of polyesters such as polyethylene terephthalate, polytrimethylene terephthalate and polybutylene terephthalate.

20 Claims, No Drawings

CATALYST AND PROCESS

CROSS-REFERENCE TO RELATED APPLICATIONS

This application is a divisional of and claims priority to U.S. patent application Ser. No. 10/537,651, filed on Oct. 31, 2005, published as U.S. Publication No. 2006/0155102 A1 and entitled "Catalyst and Process," which is a filing under 35 U.S.C. 371 of International Application No. PCT/GB2003/ 005180, filed Dec. 1, 2003 and claims priority to British Patent Application No. 0228267.1, filed Dec. 4, 2002.

FIELD OF THE INVENTION

The invention concerns an esterification process and in particular an esterification process which utilises a novel organotitanium or organozirconium catalyst which is particularly suitable for use in the manufacture of polybutylene terephthalate.

BACKGROUND OF THE INVENTION

Organotitanium compounds and, in particular, titanium alkoxides are known as catalysts for esterification processes. During the esterification, these compounds are frequently converted to polymeric compounds of titanium which result in a hazy product. The presence of a haze is a particular disadvantage in polyesters which have a high viscosity and/or high melting point and are therefore difficult to filter. Furthermore, many organotitanium compounds which are effective catalysts in the manufacture of polyesters such as polyethylene terephthalate are known to produce unacceptable yellowing in the final polymer. Tetra(n-butyl)titanate (TNBT) is a widely used catalyst for the preparation of polybutylene terephthalate (PBT). TNBT is susceptible to hydrolysis which may lead to the formation of small amounts of solid hydrolysis products which can reduce the effectiveness of filtration equipment used in the manufacturing process.

In GB-A-2314081, an esterification catalyst comprising the reaction product of an alkoxide or condensed alkoxide of titanium or zirconium, an alcohol containing at least two hydroxyl groups, a 2-hydroxy carboxylic acid and a base. In that patent, the preferred amount of base for monobasic 2-hydroxy acids such as lactic acid, is in the range 0.8 to 1.2 mole per mole of 2-hydroxy acid. In the case of citric acid (a tribasic acid), the preferred amount is in the range 1 to 3 moles base per mole of 2-hydroxy acid. We have found that when a catalyst composition of the type described in GB-A-2314081 is made using 1,4-butane diol as the dihydric alcohol and an inorganic base is present in the preferred concentration range, the 1,4-butane diol forms a complex with the base leading to formation of a gelled product which is not suitable for use as a catalyst.

DETAILED DESCRIPTION OF THE INVENTION

According to the invention we therefore provide a catalyst composition comprising the reaction product of an alkoxide or condensed alkoxide of a metal M, selected from titanium, zirconium, hafnium, aluminium, or a lanthanide, an alcohol containing at least two hydroxyl groups, a 2-hydroxy carboxylic acid and a base, wherein the molar ratio of base to 2-hydroxy carboxylic acid is in the range 0.01-0.79:1.

According to a further aspect of the invention, we also provide a process for the preparation of an ester comprising carrying out an esterification reaction in the presence of a catalyst comprising the reaction product of an alkoxide or condensed alkoxide of a metal M, selected from titanium, zirconium, hafnium, aluminium, or a lanthanide, an alcohol containing at least two hydroxyl groups, a 2-hydroxy carboxylic acid and a base, wherein the molar ratio of base to 2-hydroxy carboxylic acid is in the range 0.01-0.79:1.

Preferred metals are titanium and zirconium.

The catalyst of the invention is the reaction product of a titanium, zirconium, hafnium, aluminium, or lanthanide alkoxide or condensed alkoxide, an alcohol containing at least two hydroxyl groups, a 2-hydroxy carboxylic acid and a base. Preferably, the alkoxide has the formula $M(OR)_x$ in which M is titanium, zirconium, hafnium, aluminium, or a lanthanide, R is an alkyl group and x is the valency of the metal M. More preferably R contains 1 to 6 carbon atoms and particularly suitable alkoxides include tetraisopropoxy titanium, tetra-n-butoxy titanium, tetra-n-propoxy zirconium, tetra-n-butoxy zirconium and aluminium tri-sec-butoxide.

The condensed alkoxides suitable for preparing the catalysts useful in this invention are typically prepared by careful hydrolysis of titanium or zirconium alkoxides and are frequently represented by the formula $R^1O[M(OR^1)_2O]_nR^1$ in which $R^1$ represents an alkyl group and M represents titanium, zirconium, hafnium, aluminium, or a lanthanide, preferably titanium or zirconium. Preferably, n is less than 20 and more preferably is less than 10. Preferably $R^1$ contains 1 to 6 carbon atoms and useful condensed alkoxides include the compounds known as polybutyl titanate, polyisopropyl titanate and polybutyl zirconate.

Preferably the alcohol containing at least two hydroxyl groups is a dihydric alcohol e.g. 1,2-ethanediol, 1,2-propanediol, 1,3-propanediol, 1,4-butane diol or a dihydric alcohol containing a longer chain such as diethylene glycol or a polyethylene glycol. Particularly preferred is 1,4-butane diol. The catalyst can also be prepared from a polyhydric alcohol such as glycerol, trimethylolpropane or pentaerythritol. When the catalyst is intended for polyester manufacture, the alcohol containing at least two hydroxyl groups is preferably of a similar composition to that used in the polyesterification reaction.

Preferably the catalyst is prepared by reacting a dihydric alcohol with an alkoxide or condensed alkoxide in a ratio of from 2 to 12 moles of dihydric alcohol to each mole of the titanium or zirconium. More preferably the reaction product contains 4 to 8 moles dihydric alcohol per mole of metal M. Preferred 2-hydroxy carboxylic acids are selected from a group consisting of lactic acid, citric acid, malic and tartaric acid. Some suitable acids are supplied as hydrates or as aqueous mixtures. Acids in this form as well as anhydrous acids are suitable for preparing the catalysts used in this invention. The preferred molar ratio of acid to metal M in the reaction product is 1 to 4 moles (more preferably 1.5 to 3.5 moles) of 2-hydroxy acid per mole of metal M.

The base used in preparing the catalyst composition is generally an inorganic base and suitable bases include aqueous solutions of salts of weak acids with metals selected from Group IA or IIA of the periodic table of elements or with zinc, aluminium, iron(II), copper(II), nickel, cobalt (II), manganese (II), lanthanum, cerium, neodymium, and samarium. Preferred bases include sodium hydroxide, potassium hydroxide, ammonium hydroxide, lithium hydroxide, sodium carbonate, magnesium hydroxide, calcium hydroxide, aluminium acetate, zinc oxide, caesium carbonate and ammonia. The molar ratio of base to 2-hydroxy carboxylic acid is in the range 0.05 to 0.79:1. In the case of citric acid (a tribasic acid), the preferred amount is in the range 0.01 to 0.6 moles base per mole of 2-hydroxy acid. In general, the amount of base present is usually in the range 0.05 to 2.4 moles (preferably from 0.5 to 2, especially 0.7 to 1.5 moles) per mole of metal M.

It is frequently convenient to add water together with the base when preparing the catalysts.

The catalyst can be prepared by mixing the components (alkoxide or condensed alkoxide, dihydric alcohol, 2-hydroxy acid and base) with removal of any by-product, (e.g. isopropyl alcohol when the alkoxide is tetraisopropoxytitanium), at any appropriate stage. In one preferred method the alkoxide or condensed alkoxide and dihydric alcohol are mixed and subsequently, 2-hydroxy acid and then base are added or a pre-neutralised 2-hydroxy acid solution, is added. In an alternative preferred method the alkoxide or condensed alkoxide is reacted with the 2-hydroxy acid and by-product alcohol is removed. Base is then added to this reaction product followed by a dihydric alcohol to produce the reaction product which is a catalyst of the invention. If desired, further by-product alcohol can then be removed by distillation. The catalyst may be diluted in a solvent, which is preferably the alcohol to be used in the esterification reaction. For example, if the catalyst is to be used for making polybutylene terephthalate, then the catalyst may be diluted in 1,4-butanediol.

The esterification reaction of the process of the invention can be any reaction by which an ester is produced. The reaction may be a direct esterification in which a carboxylic acid or its anhydride react with an alcohol to form an ester; or a transesterification (alcoholysis) in which a first alcohol reacts with a first ester to produce an ester of the first alcohol and a second alcohol produced by cleavage of the first ester; or a interesterification reaction in which two esters are reacted to form two different esters by exchange of alkoxy radicals.

Many carboxylic acids and anhydrides can be used in direct esterification including saturated and unsaturated monocarboxylic acids such as stearic acid, isostearic acid, capric acid, caproic acid, palmitic acid, oleic acid, palmitoleic acid, triacontanoic acid, benzoic acid, methyl benzoic acid and salicylic acid, dicarboxylic acids such as phthalic acid, isophthalic acid, terephthalic acid, sebacic acid, adipic acid, azelaic acid, succinic acid, fumaric acid, maleic acid, naphthalene dicarboxylic acid and pamoic acid and anhydrides of these acids and polycarboxylic acids such as trimellitic acid, citric acid, trimesic acid, pyromellitic acid and anhydrides of these acids. Alcohols frequently used for direct esterification include aliphatic straight chain and branched monohydric alcohols such as butyl, pentyl, hexyl, octyl and stearyl alcohols and polyhydric alcohols such as glycerol and pentaerythritol. A preferred process of the invention comprises reacting 2-ethylhexanol with phthalic anhydride to form bis(2-ethylhexyl)phthalate.

The esters employed in an alcoholysis reaction are generally the lower homologues such as methyl, ethyl and propyl esters since, during the esterification reaction, it is usual to eliminate the displaced alcohol by distillation. Such esters of the acids suitable for direct esterification are used in the process of the invention. Frequently (meth)acrylate esters of longer chain alcohols are produced by alcoholysis of esters such a methyl acrylate, methyl methacrylate, ethyl acrylate and ethyl methacrylate. Typical alcohols used in alcoholysis reactions include butyl, hexyl, n-octyl and 2-ethyl hexyl alcohols and substituted alcohols such as dimethylaminoethanol.

When the esterification reaction is a transesterification between two esters, generally the esters will be selected so as to produce a volatile product ester which can be removed by distillation.

Polymeric esters can be produced by processes involving direct esterification or transesterification and a particularly preferred embodiment of the process of the invention is a polyesterification reaction in the presence of the catalyst described hereinbefore. In a polyesterification reaction polybasic acids or esters of polybasic acids are usually reacted with polyhydric alcohols to produce a polymeric ester, often via a diester intermediate product. Linear polyesters are produced from dibasic acids such as those mentioned hereinbefore or esters of said dibasic acids and dihydric alcohols. Alternatively, the preparation of polyesters may be achieved starting from an ester (typically a low alkyl ester) of a dicarboxylic acid, which may be e.g. a $C_1$-$C_6$ alkyl ester of any of the di- or poly-carboxylic acids mentioned above. Of these, methyl esters such as, in particular dimethyl terephthalate or dimethyl naphthalate, are preferred starting materials for the preparation of polyesters. Preferred polyesterification reactions according to the invention include the reaction of terephthalic acid or dimethyl terephthalate with 1,2-ethanediol (ethylene glycol) to produce polyethylene terephthalate (PET), with 1,3-propane diol to form polypropylene terephthalate (also known as poly(trimethylene)terephthalate or PTT), or with 1,4-butanediol (butylene glycol) to produce polybutylene terephthalate (PBT) or reaction of naphthalene dicarboxylic acid with 1,2-ethanediol to produce polyethylene naphthalate (PEN). Other glycols such as 1,6-hexanediol, and pentaerythritol are also suitable for preparing polyesters.

The catalyst and process of the present invention are particularly suitable for the preparation of PBT, PET or PTT by the reaction of terephthalic acid or an ester thereof with 1,4-butane diol, 1,3-propane diol or 1,2-ethane diol. We have found that the catalyst and process of the invention show numerous benefits compared with the known titanium alkoxide catalysts. For example, when used to make PBT, the catalysts and process of the invention can produce a polymer with better filtration properties than the commonly used TNBT catalyst and that the rate of reaction is at least as fast and often faster than using TNBT.

A typical process for the preparation of polybutylene terephthalate comprises two stages. In the first stage dimethyl terephthalate is reacted with 1,4-butanediol to form a prepolymer and the by-product methanol is removed. The prepolymer is subsequently heated in a second stage under reduced pressure to remove 1,4-butanediol and form a long chain polymer. Either or both these stages may comprise a process according to this invention.

The esterification reaction of the invention can be carried out using any appropriate, known technique for an esterification reaction.

In direct esterification the acid or anhydride and an excess of alcohol are typically heated, if necessary in a solvent, in the presence of the catalyst. Water is usually the by-product of the reaction and this is removed, as an azeotrope with a boiling mixture of solvent and/or alcohol. Generally, the solvent and/or alcohol mixture which is condensed is immiscible with water which is therefore separated before solvent and/or alcohol are returned to the reaction vessel. When reaction is complete the excess alcohol and, when used, solvent are evaporated. In contrast to prior art esterification processes, it is not generally necessary to remove the catalyst from the reaction mixture. A typical direct esterification reaction is the preparation of bis(2-ethylhexyl) phthalate which is prepared by mixing phthalic anhydride and 2-ethyl hexanol. An initial reaction to form a monoester is fast but the subsequent conversion of the monoester to diester is carried out by refluxing in the presence of the catalyst at a temperature of 180-200° C. until all the water has been removed. Subsequently the excess alcohol is removed.

In an alcoholysis reaction, the ester, first alcohol and catalyst are mixed and, generally, the product alcohol (second alcohol) is removed by distillation often as an azeotrope with the ester. Frequently it is necessary to fractionate the vapour mixture produced from the alcoholysis in order to ensure that the second alcohol is separated effectively without significant loss of product ester or first alcohol. The conditions under which alcoholysis reactions are carried out depend principally upon the components of the reaction and generally components are heated to the boiling point of the mixture used.

A preferred process of the invention is the preparation of polybutylene terephthalate. A typical batch production of polybutylene terephthalate is carried out by charging terephthalic acid and 1,4 butanediol to a reactor along with catalyst if desired and heating the contents to 170-210° C. under a pressure of about 0.3 MPa. Reaction commences as the acid dissolves at about 230° C. and water is removed. The product is transferred to a second autoclave reactor and catalyst is added, if needed. The reactor is heated to 240-260° C. under an eventual vacuum of 100 Pa to remove 1,4 butanediol by-product. The molten product ester is discharged from the reactor, cooled and chipped. Conventional additives to polyesterification reactions, such as colour modifiers (e.g. cobalt compounds, pigments or dyes), stabilisers (especially those based on phosphorus compounds e.g. phosphoric acid or phosphate ester species), fillers etc may also be added to the polyester reaction mixture.

The amount of catalyst used in the process of the invention generally depends upon the metal content, expressed as elemental metal, of the catalyst. Usually the amount is from 30 to 1000 parts per million (ppm) on weight of product ester for direct or transesterification reactions. Preferably the amount is from 30 to 450 ppm on weight of product ester and more preferably 50 to 450 ppm on weight of product ester. In polyesterification reactions the amount used is generally expressed as a proportion of the weight of product polyester and is usually from 5 to 500 ppm expressed as metal based on product polyester. Preferably the amount is from 5 to 150 ppm expressed as metal, e.g. as Ti or Zr.

The process of this invention has been shown to effectively produce esters and polyesters at an economical rate.

The invention is illustrated by the following examples.

EXAMPLES

Example 1

Comparative

Citric acid monohydrate (300 g, 1.43 moles) was dissolved in warm water (209 g) in a 1 liter fishbowl flask fitted with stirrer, condenser and thermometer. To the stirred solution was added slowly titanium isopropoxide (162 g, 0.57 moles) (VERTEC™ TIPT) from a dropping funnel. A mixture of isopropanol and water was removed by distillation at about 80-85.degree. C. The product was cooled to around 60° C. and 32% wt/wt aqueous NaOH (214 g, 1.71 moles) was added slowly by dropping funnel to the stirred solution. The resulting product was cooled, then mixed with 1,4-butanediol (411 g, 4.56 moles) and heated under vacuum to remove isopropanol/water. The product formed a gel at this point.

Example 2

Citric acid monohydrate (300.1 g, 1.43 moles) was dissolved in warm water (209 g) in a 1 liter fishbowl flask fitted with stirrer, condenser and thermometer. To the stirred solution was added slowly tetra(n-butyl)titanate (194 g, 0.57 moles) (VERTEC™ TNBT) from a dropping funnel. A mixture of n-butanol and water was removed by distillation at about 80-85° C. under vacuum. The product was cooled to around 60° C. and 5% wt/wt aqueous NaOH (600 g, 0.75 moles) was added slowly by dropping funnel to the stirred solution. The resulting product was cooled, then mixed with 1,4-butanediol (411 g, 4.56 moles) and heated under vacuum to remove n-butanol/water. The product was a clear mobile liquid.

Example 3

Citric acid monohydrate (300 g, 1.43 moles) was dissolved in warm water (209 g) in a 1 liter fishbowl flask fitted with stirrer, condenser and thermometer. To the stirred solution was added slowly tetra(n-butyl)titanate (194.0 g, 0.57 moles) from a dropping funnel. A butanol/water mixture was removed by distillation at about 80-85° C. under vacuum. The product was cooled to around 60° C. and 5% wt/wt aqueous NaOH (400 g, 0.5 moles) was added slowly by dropping funnel to the stirred solution. The resulting product was cooled, then mixed with 1,4-butanediol (411 g, 4.56 moles) and heated under vacuum to remove n-butanol/water. The product was a clear mobile liquid.

Example 4

Citric acid monohydrate (300 g, 1.43 moles) was dissolved in warm water (209 g) in a 1 liter fishbowl flask fitted with stirrer, condenser and thermometer. To the stirred solution was added slowly tetra(n-butyl)titanate (194.0 g, 0.57 moles) from a dropping funnel. A butanol/water mixture was removed by distillation at about 80-85° C. under vacuum. The product was cooled to around 60° C. and 5% wt/wt aqueous NaOH (400 g, 0.5 moles) was added slowly by dropping funnel to the stirred solution. The resulting product was cooled, then mixed with 1,4-butanediol (634 g, 7.05 moles) and heated under vacuum to remove n-butanol/water. The product was a clear mobile liquid.

Example 5

Citric acid monohydrate (150 g, 0.71 moles was dissolved in warm water (104.5 g) in a 1 liter fishbowl flask fitted with stirrer, condenser and thermometer. To the stirred solution was added slowly titanium isopropoxide (81.0 g, 0.28 moles) from a dropping funnel. and an isopropanol/water mixture was removed by distillation at about 80-85° C. under vacuum. The product was cooled to about 60° C. and 5% wt/wt aqueous NaOH (200 g, 0.25 moles) was added slowly by dropping. funnel to the stirred solution. The resulting product was cooled, then mixed with 1,4-butane diol (206 g, 2.28 moles) and heated under vacuum to remove isopropanol/water. The product was then filtered to provide a clear viscous liquid.

Example 6

Citric acid monohydrate (150 g, 0.71 moles) was dissolved in warm water (104.5 g) in a 1 liter fishbowl flask fitted with stirrer, condenser and thermometer. To the stirred solution was added slowly tetra(n-butyl)titanate (97.0 g, 0.28 moles) from a dropping funnel. A butanol/water mixture was removed by distillation at about 80-90° C. under vacuum. The product was cooled to about 60° C. and 5% wt/wt aqueous NaOH (200 g, 0.25 moles) was added slowly by dropping funnel to the stirred solution. The resulting product was cooled, then mixed with 1,3-propanediol (174 g, 2.28 moles) and heated under vacuum to remove butanol/water. The product was then filtered to provide a clear viscous mobile liquid.

Example 7

Citric acid monohydrate (150 g, 0.71 moles) was dissolved in warm water (105 g) in a 1 liter fishbowl flask fitted with stirrer, condenser and thermometer. To the stirred solution was added slowly tetra(n-butyl)titanate (97.0 g, 0.28 moles) from a dropping funnel. A butanol/water mixture was removed by distillation at about 80-90° C. under vacuum. The product was cooled to about 60° C. and 10% wt/wt aqueous NaOH (100 g, 0.25 moles) was added slowly by dropping funnel to the stirred solution. The resulting product was cooled, then mixed with 1,3-propanediol (173.5 g, 2.28 moles) and heated under vacuum to remove butanol/water. The product was then filtered to provide a clear viscous mobile liquid.

Example 8

Citric acid monohydrate (150 g, 0.71 moles) was dissolved in warm water (104.5 g) by heating in a 2 liter fishbowl flask fitted with stirrer, condenser and thermometer. To the stirred solution was added slowly tetra(n-butyl)titanate (97 g, 0.28 moles) from a dropping funnel. A butanol/water mixture was removed by distillation at about 80-90° C. under vacuum. The product was cooled to about 60° C. and 5% wt/wt aqueous $Mg(OH)_2$ (292 g, 0.25 moles) and 1,3-propanediol (173.5 g, 2.28 moles) were added slowly by dropping funnel to the stirred solution. The resulting product was refluxed for 1 hour under vacuum to remove butanol/water. The product was then filtered to provide a clear viscous mobile liquid.

Example 9

Water (52.25 g, 2.90 moles) and citric acid monohydrate (75 g, 0.36 moles) were placed into a pre-weighted rotary evaporator flask, and heated for 15 minutes to dissolve the citric acid. The solution was allowed to cool. A vacuum was applied to the flask and titanium (IV) n-butoxide (48.5 g, 0.14 moles) added via vacuum inlet. An azeotrope of n-butanol/water was removed under reduced pressure. The resulting mixture was allowed to cool before the dropwise addition of 5% magnesium hydroxide in water (145 g, 0.125 moles). 1,4-butanediol (103 g, 1.14 moles) was then added dropwise, whilst stifling. An azeotrope of n-butanol/water was removed under reduced pressure. The resulting mixture was allowed to cool before 50% dilution with 1,4-butanediol to yield a slightly hazy solution with a titanium content of 1.54%.

Example 10

Example 9 was repeated except that 5% lithium hydroxide in water (105 g, 0.125 moles) was added in place of the magnesium hydroxide. The resulting mixture was allowed to cool before 50% dilution with 1,4-butanediol to yield a slightly hazy solution with a titanium content of 1.33%.

Example 11

Example 9 was repeated except that 5% aluminium acetate $((CH_3CO_2)_2AlOH)$ in water (408 g, 0.125 moles) was added in place of the magnesium hydroxide. The resulting mixture was allowed to cool before 50% dilution with 1,4-butanediol to yield a slightly hazy solution with a titanium content of 1.84%.

Example 12

Example 9 was repeated except that 5% zinc oxide in water (203, 0.125 moles) was added in place of the magnesium hydroxide. The resulting mixture was allowed to cool before 50% dilution with 1,4-butanediol to yield a slightly hazy solution with a titanium content of 2.10%.

Example 13

Example 9 was repeated except that 5% caesium carbonate in water (407 g, 0.125 moles) was added in place of the magnesium hydroxide. The resulting mixture was allowed to cool before 50% dilution with 1,4-butanediol to yield a slightly hazy solution with a titanium content of 1.71%.

Example 14

A 50% w/w aqueous citric acid solution (577 g, 1.5 moles citric acid) was put in a flask. To the stirred solution was slowly added titanium isopropoxide (284 g, 1 moles). This mixture was heated to reflux for 1 hour to yield a hazy solution and heated under vacuum to remove free water and isopropanol. The product was cooled below 70° C. and 32% w/w aqueous sodium hydroxide (125 g, 1 moles) was added slowly to the stirred solution. The product was filtered, mixed with ethylene glycol (496 g, 8 moles) and heated under vacuum to remove free water/isopropanol. The product was a slightly hazy, very pale yellow liquid (Ti content 5.0% by weight).

Example 15

A 50% aqueous citric acid solution (548.5 g, 1.4 moles of citric acid) was put in a 1 liter fishbowl flask fitted with stirrer, condenser and thermometer. To the stirred solution was added slowly tetra(n-butyl)titanate (194 g, 0.57 moles) from a dropping funnel. An n-butanol/water mixture was removed by distillation at about 80-85° C. under vacuum. The product was cooled to around 60° C. and 5% wt/wt aqueous NaOH (626 g, 0.78 moles) was added slowly by dropping funnel to the stirred solution. The resulting product was cooled, then mixed with 1,4-butanediol (180 g, 2.0 moles) and heated under vacuum to remove n-butanol/water. The product was a clear mobile liquid.

Example 16

A 50% aqueous citric acid solution (548.5 g, 1.4 moles of citric acid) was put in a 1 liter fishbowl flask fitted with stirrer, condenser and thermometer. To the stirred solution was added slowly tetra(n-butyl)titanate (340 g, 1 mole) from a dropping funnel. A n-butanol/water mixture was removed by distillation at about 80-85° C. The product was cooled to around 60 c and 5% w/w aqueous NaOH (626 g, 0.78 moles) was added slowly by dropping funnel to the stirred solution. The resulting product was cooled, then mixed with 1,4-butanediol (180 g, 2 moles) and heated under vacuum to remove n-butanol/water. The product was a clear mobile liquid.

Example

Comparative

The procedure of Example 15 was followed but using 132.5 g, (0.63 moles) of citric acid, 72.0 g, (0.25 moles) of titanium isopropoxide, 94.9 g, (0.76 moles) of 32% w/w aqueous sodium hydroxide and 125.5 g, (2.0 moles) of ethylene glycol. The product was a slightly hazy, very pale yellow liquid (ti content 3.85% by weight).

The catalyst compositions in Example 1-17 are summarised in Table 1.

The colour of the polymer was measured using a Byk-Gardner Colourview spectrophotometer. A common model to use for colour expression is the Cielab L*. a* and b* scale where the b*-value describes yellowness. The yellowness of the polymer increases with b*-value. The results are shown in Table 2.

| Example | Titanate | Base | $\frac{\text{mols base}}{\text{mols acide}}$ | Diol | $\frac{\text{mols diol}}{\text{mols Ti}}$ |
|---|---|---|---|---|---|
| 1* | TIPT | NaOH | 1.20 | 1,4-butane diol | 8 |
| 2 | TNBT | NaOH | 0.53 | 1,4-butane diol | 8 |
| 3 | TNBT | NaOH | 0.34 | 1,4-butane diol | 8 |
| 4 | TNBT | NaOH | 0.35 | 1,4-butane diol | 12.4 |
| 5 | TIPT | NaOH | 0.35 | 1,4-butane diol | 8.1 |
| 6 | TNBT | NaOH | 0.35 | 1,3-propane diol | 8.1 |
| 7 | TNBT | NaOH | 0.35 | 1,3-propane diol | 8.1 |
| 8 | TNBT | $Mg(OH)_2$ | 0.35 | 1,3-propane diol | 8.1 |
| 9 | TNBT | $Mg(OH)_2$ | 0.35 | 1,4-butane diol | 8.1 |
| 10 | TNBT | LiOH | 0.35 | 1,4-butane diol | 8.1 |
| 11 | TNBT | $(CH_3CO_2)_2AlOH$ | 0.35 | 1,4-butane diol | 8.1 |
| 12 | TNBT | ZnO | 0.35 | 1,4-butane diol | 8.1 |
| 13 | TNBT | $Cs_2CO_3$ | 0.35 | 1,4-butane diol | 8.1 |
| 14 | TIPT | NaOH | 0.67 | 1,2-ethane diol | 8 |
| 15 | TNBT | NaOH | 0.56 | 1,4-butane diol | 3.5 |
| 16 | TNBT | NaOH | 0.56 | 1,4-butane diol | 2.0 |
| 17 | TIPT | NaOH | 1.21 | 1,2-ethane diol | 8 |

Notes:
*= Comparative
TNBT = tetra n-butyl titanate
TIPT = tetra isopropul titanate

Example 18

Preparation of PBT from Dimethyl Terephthalate 1,4-butanediol (58 g) and dimethyl terephthalate (46.5 g) were charged to a jacketed reactor and maintained at a temperature of 160.degree. C. The catalyst TNBT (tetra(n-butyl) titanate) or a catalyst made in one of the preceding examples was added and the reactor heated to 210-260.degree. C. to initiate the first stage interesterification process and continued until all of the methanol had been removed. On completion of the DE reaction the pressure was reduced to 1 mbar and the mixture maintained at 260.degree. C. under vacuum to remove 1,4-butanediol and yield polybutylene terephthalate. After 70 minutes of polymerisation time, the product polymer had an intrinsic viscosity (IV) (as measured by solution viscosity on an 8% solution of the polyester in o-chlorophenol at 25.degree. C.) of 0.932.

Example 19

Preparation of PBT from Terephthalic Acid

The catalyst prepared in Example 3 was used to prepare polybutylene terephthalate (PBT). 1,4-butanediol (2.907 kg) and terephthalic acid (3.154 kg) were charged to a jacketed reactor and maintained at a temperature of 160° C. The catalyst (18.62 g, 90 ppm Ti w/w on final polymer) was added and the reactor heated to 210-260° C. to initiate the first stage esterification process and continued until all of the water had been removed. On completion of the direct esterification (DE) reaction, the pressure was reduced to 1 mbar and the mixture maintained at 260.degree. C. under vacuum to remove 1,4-butanediol by polycondensation (PC) and yield polybutylene terephthalate. A comparison process was run using TNBT as a catalyst.

TABLE 3

| Catalyst | Ti ppm | DE mins | PC mins | L | a* | b* | IV dl/g | CEG meq/g |
|---|---|---|---|---|---|---|---|---|
| TNBT | 90 | 72 | 178 | 89.51 | −1.15 | 4.64 | 0.94 | 16.3 |
| Example 3 | 90 | 55 | 160 | 89.49 | −0.81 | 7.52 | 0.94 | 16 |

Example 20

Preparation of the Poly(ethylene terephthalate) (PET)

Ethylene glycol (2.04 kg), isophthalic acid (125 g) and terephthalic acid (4.42 kg) were charged to a stirred, jacketed reactor. The catalyst was added and the reactor heated to 226-252° C. at a pressure of 40 psi to initiate the first stage direct esterification (DE) process. Water was removed as it was formed with recirculation of the ethylene glycol. On completion of the DE reaction the contents of the reactor were allowed to reach atmospheric pressure before a vacuum was steadily applied. A phosphorus-containing stabiliser and

TABLE 2

| Catalyst | Ti ppm | PC mins | P (ppm) | Colour L* | a* | b* | IV di/g |
|---|---|---|---|---|---|---|---|
| TNBT | 160 | 70 | — | 68.48 | −1.29 | −0.65 | 0.932 |
| Example 3 | 160 | 70 | — | 78.33 | −1.36 | 1.79 | 0.915 |
| Example 3 | 160 | 70 | 2* | 82.5 | −1.03 | 2.8 | 0.79 |
| Example 4 | 160 | 70 | — | 74.77 | −0.72 | 0.68 | 0.612 |
| Example 9 | 160 | 70 | — | 68.50 | −1.14 | 3.62 | 0.882 |
| Example 10 | 160 | 70 | — | 65.65 | −1.35 | 0.72 | 0.661 |
| Example 11 | 160 | 70 | — | 79.06 | −0.65 | 2.37 | 0.603 |
| Example 12 | 160 | 70 | — | 72.43 | −0.79 | 1.46 | 0.765 |
| Example 13 | 160 | 70 | — | 62.50 | −1.16 | −2.80 | 0.668 | cobalt acetate were added and the mixture heated to 290.±0.2° C. under vacuum to remove ethylene glycol and yield polyethylene terephthalate. The final polyester was discharged once a constant torque had been reached which indicated an IV of about 0.62.

The crystallisation behaviour of the resulting PET polymer was investigated using differential scanning calorimetry (DSC). A 10 mg specimen was dried overnight under vacuum at 80° C. The dried specimen was heated at 290° C. for 2 minutes in the Perkin-Elmer DSC7A before being quench-cooled, onto a cold block. The quenched specimen was then heated from 0° C. to 290° C. at a rate of 20° C./minute, held at that temperature for 2 minutes, cooled back to 0° C., held for 2 minutes then reheated. A correction of 3.1° C. has been applied to the computer generated cooling temperature data.

The catalysts used, and the results are shown in Table 4. The results show that the temperatures for onset of crystallisation ($Tn_o$) and crystallisation (Tn) are higher for the polyester produced using the catalyst of the invention in which the ratio of base to acid is 0.67, than for the polyester produced with the comparative catalyst in which the ratio of base to acid is 1.21 although the melting points are the same. These results provide evidence that the catalysts of the prior art, containing higher levels of base, induce faster crystallisation. The fabricator of e.g. polyester film may find a wider thermal processing window using polyester made with catalysts of the invention because crystallisation is slower.

TABLE 4

| | Initial Heat (sample dried and quenched) | | | | | |
|---|---|---|---|---|---|---|
| Catalyst | $Tg_o$ ° C. | $Tn_o$ ° C. | Tn ° C. | ΔH J/g | Tp ° C. | ΔH J/g |
| Example 14 | 75 | 150 | 165 | −36 | 246 | 36 |
| Example 17 (comparative) | 77 | 145 | 162 | −36 | 246 | 35 |

The invention claimed is:

1. A process for preparation of a catalyst compositions comprising reacting an alkoxide or condensed alkoxide of a metal M, selected from titanium, zirconium, hafnium, aluminium, or a lanthanide; an alcohol containing at least two hydroxyl groups; a 2-hydroxy carboxylic acid; and a base, wherein the molar ratio of base to said 2-hydroxy carboxylic acid is in the range 0.01-0.67:1.

2. The process accordingly to claim 1, wherein the alkoxide or condensed alkoxide and dihydric alcohol are mixed and subsequently, 2-hydroxy acid and then base are added or a pre-neutralised 2-hydroxy acid solution, is added.

3. The process according to claim 1 wherein the alcohol containing at least two hydroxyl groups is selected from the group consisting of 1,2-ethanediol, 1,2-propanediol, 1,3-propanediol, 1,4-butane diol, diethylene glycol and polyethylene glycol.

4. The process according to claim 1 wherein the base is selected from the group consisting of sodium hydroxide, potassium hydroxide, ammonium hydroxide, lithium hydroxide, sodium carbonate, magnesium hydroxide, calcium hydroxide, aluminium acetate, zinc oxide, caesium carbonate and ammonia.

5. A process according to claim 1, wherein the alkoxide or condensed alkoxide is reacted with a 2-hydroxy carboxylic acid and removing the by-product alcohol, followed by addition of base to this reaction product, and then by addition of dihydric alcohol to produce the catalyst composition, wherein the molar ratio of base to said 2-hydroxy carboxylic acid is in the range 0.01-0.67:1.

6. The process according to claim 5 further comprising diluting the catalyst in an additional amount of the dihydric alcohol.

7. The process according to claim 5, wherein the 2-hydroxy carboxylic acid is selected from the group consisting of lactic acid, citric acid, malic acid and tartaric acid.

8. A process for the preparation of an ester comprising carrying out an esterification reaction in the presence of a catalyst composition prepared according to claim 1 comprising the reaction product of an alkoxide or condensed alkoxide of a metal M, selected from titanium, zirconium, hafnium, aluminium, or a lanthanide; an alcohol containing at least two hydroxyl groups; a 2-hydroxy carboxylic acid; and a base, wherein the molar ratio of base to 2-hydroxy carboxylic acid is in the range 0.01-0.67:1.

9. The process according to claim 8, wherein said esterification reaction comprises the reaction of an acid or anhydride selected from the group consisting of stearic acid, isostearic acid, capric acid, caproic acid, palmitic acid, oleic acid, palmitoleic acid, triacontanoic acid, benzoic acid, methyl benzoic acid, salicylic acid, phthalic acid, isophthalic acid, terephthalic acid, sebacic acid, adipic acid, azelaic acid, succinic acid, fumaric acid, maleic acid, naphthalene dicarboxylic acid, pamoic acid, trimellitic acid, citric acid, trimesic acid, pyromellitic acid and anhydrides of these acids with an alcohol selected from the group consisting of butyl, pentyl, hexyl, octyl and stearyl alcohols, 2-ethylhexanol, glycerol and pentaerythritol.

10. The process according to claim 8, wherein said esterification reaction is a polyesterification reaction comprising the reaction of one or more polybasic acids or esters of polybasic acids and one or more polyhydric alcohols to produce a polymeric ester.

11. The process according to claim 10, wherein said polyesterification reaction comprises the reaction of terephthalic acid or dimethyl terephthalate with 1,2-ethanediol (ethylene glycol) to produce polyethylene terephthalate, with 1,3-propane diol to form poly(trimethylene)terephthalate, or with 1,4-butanediol (butylene glycol) to produce polybutylene terephthalate (PBT) or the reaction of naphthalene dicarboxylic acid with 1,2-ethanediol to produce polyethylene naphthalate (PEN).

12. The process according to claim 10, wherein said polyesterification reaction comprises the reaction of terephthalic acid or dimethyl terephthalate with 1,6-heaxanediol or pentaerythritol.

13. The process according to claim 10, wherein the terephthalic acid or dimethyl terephthalate and 1,4 butanediol are reacted at a temperature of from about 170° C. to about 210° C. under a pressure of about 0.3 MPa.

14. The process according to claim 8 wherein the catalyst is present in an amount of from about 30 ppm to about 1000 ppm.

15. The process according to claim 8, wherein the alcohol containing at least two hydroxyl groups is selected from the group consisting of 1,2-ethanediol, 1,2-propanediol, 1,3-propanediol, 1,4-butane diol, diethylene glycol and polyethylene glycol.

16. The process according to claim 8, wherein the 2-hydroxy carboxylic acid is selected from the group consisting of lactic acid, citric acid, malic acid and tartaric acid.

17. The process according to claim 8, wherein M is selected from titanium and zirconium.

18. The process according to claim 17, wherein the molar ratio of the 2-hydroxy carboxylic acid to titanium or zirconium in the reaction product is from 1 to 4 moles of 2-hydroxy carboxylic acid per mole of metal M.

19. The process according to claim 8, wherein the base is selected from the group consisting of sodium hydroxide, potassium hydroxide, ammonium hydroxide, lithium hydroxide, sodium carbonate, magnesium hydroxide, calcium hydroxide, aluminium acetate, zinc oxide, caesium carbonate and ammonia.

20. The process according to claim 8 wherein the esterification reaction is a transesterification reaction and the product comprises a volatile ester.

\* \* \* \* \*